No. 861,633. PATENTED JULY 30, 1907.
A. BRECKWOLDT.
NAUTICAL LAMP.
APPLICATION FILED FEB. 11, 1907.
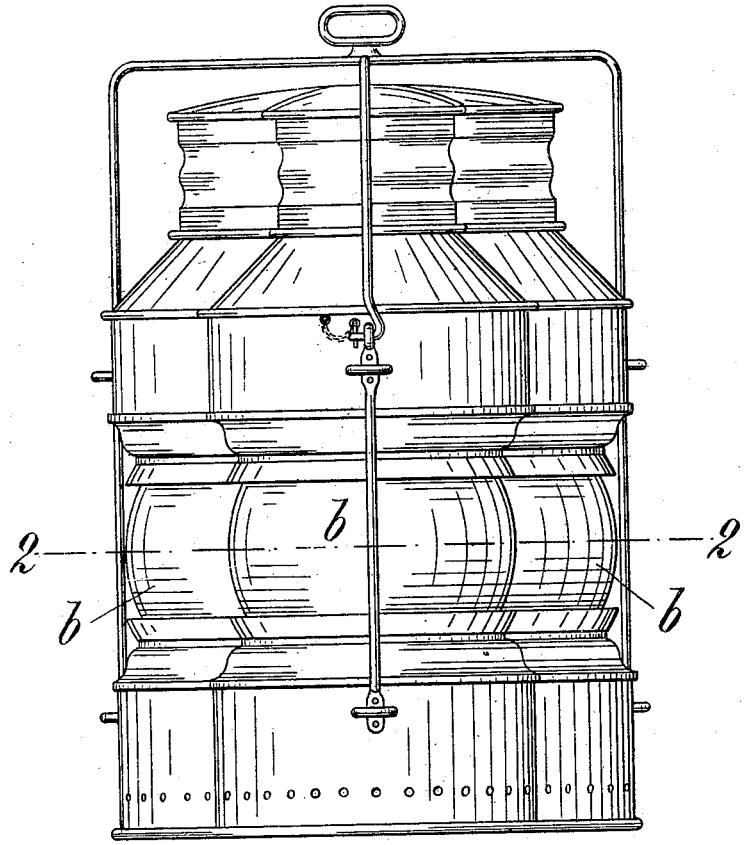
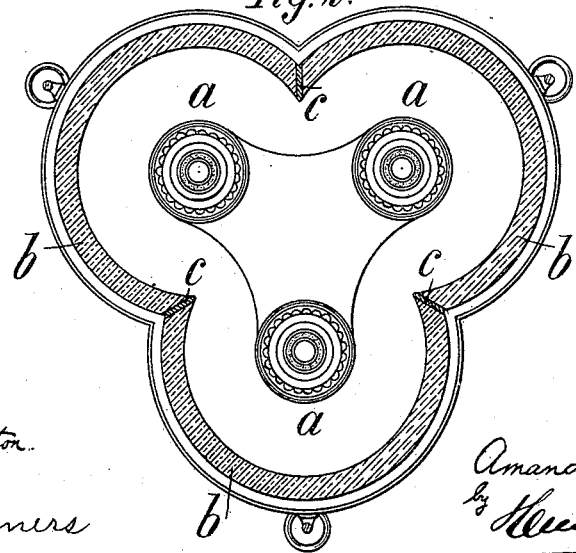
Witnesses.
Jesse N. Lutton
B. Sommers
Inventor.
Amandus Breckwoldt
by Henry Orth Jr.
Atty.

UNITED STATES PATENT OFFICE.

AMANDUS BRECKWOLDT, OF BLANKENESE, GERMANY.

NAUTICAL LAMP.

No. 861,633.

Specification of Letters Patent.

Patented July 30, 1907.

Application filed February 11, 1907. Serial No. 356,805.

*To all whom it may concern:*

Be it known that I, AMANDUS BRECKWOLDT, a citizen of Hamburg, and a resident of Blankenese, near Hamburg, in the German Empire, have invented a certain new and useful Improvement in Nautical Lamps, of which the following is a specification.

The present invention relates to nautical lamps, such as ship's lights, floating-lights, fanals, anchor-lamps and the like and the object is to construct such lamps so as to enable the light to be better seen under circumstances which heretofore made it impossible to detect the light. Lights of this kind more particularly anchor-lights heretofore had the drawback that the beam or streak of light emanating from the lamp and being relatively narrow is frequently concealed by ropes or the like and is thus made invisible. This drawback is especially often met with, when the lamp is not glowing with full power, which it is impossible to avoid. Many accidents, which frequently may not be cleared up, are the consequence thereof, since any ship coming in the direction of the line connecting the source of light and the obstacle concealing the beam of light, must, for reason of it being perfectly unwarned, run against the ship lying at anchor. The illuminating power of the casing or globe surrounding the source of light is generally too weak, especially when the lamp is burning lower, to be seen, when the beam of light is concealed. To do away with this drawback and to secure a visible source of light by all means, the present lamp is provided with three or more burners or sources of light, which are surrounded by a casing or globe shaped so as to have a surface of curvature corresponding to each burner.

In the drawing a lamp is shown having as an example three burners.

Figure 1 shows an elevation and Fig. 2 a section drawn through the line 2—2 of Fig. 1.

The three burners $a$ are so grouped as to include an equilateral triangle. Correspondingly the globe is made in three sections $b$, each surrounding one of the burners centrally. This is necessary for the reason that the walls of the known lenticular casings in vertical section have the shape of lenses, in the focus of which the source of light is situated. Therefore the burner must be placed always in the center of the globe and when the source of light is divided, as in the present instance, into three or more parts, each single section of the globe or lenticular casing must be moved outward to the same extent as its corresponding source of light is placed out of center of the complete lamp, so that each burner is in the center of that part of the globe. Between the globe sections there is in larger lamps a vertical rod $c$, which serves as part of the frame.

In the construction shown three single sources of light are arranged at such a distance from one another, that the section $b$ of the lenticular casing belonging to one source of light encompasses an angle of 240°. It has been found out that when 3 burners are used the best results are obtained when the said angle is somewhere between 120° and 240°. It appears to be of more advantage to make the said angle larger because the single sources of light are at a greater distance from one another and the circulation of air within the casing is a better one.

When making use of at least three sources of light arranged in a triangle inside of the lamp, it can not happen, that by masking two of the lights the complete lamp is made invisible, since in that case an approaching ship moving in line with two burners there are always two streaks of light visible, of which only one can be concealed by a rope or the like, so that by all means the other streak of light is visible to warn the approaching ship. Even the lenticular casing is illuminated by the three sources of light to such an extent that the lamp always can be seen for more than a mile, even if there is no beam of light itself visible.

This invention is not only limited to anchor lamps, but it may be made use of in all kinds of nautical lamps.

I claim.

1. A lamp having more than two sources of light grouped to form a polygon and a casing made in sections, the number of which corresponds to the number of sources of light, each section being concentric to a source of light and partly surrounding the same.

2. A lamp having more than two sources of light grouped to form a regular polygon and a casing made in sections, the number of which corresponds to the number of sources of light, each section being concentric to a source of light and partly surrounding the same.

3. A lamp having three sources of light disposed in a triangle, a lenticular casing encompassing an angle of substantially 240° mounted concentrically to each source, the edges of each casing abutting.

4. A lamp having three sources of light grouped to form an equilateral triangle, and a casing made in three section, each concentric to a source of light and partly surrounding the same at a distance therefrom equal to the distance of the source from the center of the lamp.

AMANDUS BRECKWOLDT.

Witnesses:
 HARRY RAECKNER,
 IDA CHRIST. HAFERMANN.